United States Patent
Lee et al.

(10) Patent No.: US 9,222,005 B2
(45) Date of Patent: Dec. 29, 2015

(54) SLIP PREVENTION PAD AND METHOD OF MANUFACTURING THE SAME

(75) Inventors: Kwon Ho Lee, Busan (KR); Yong Beom An, Busan (KR)

(73) Assignee: KWON HO LEE, Busan (KR)

( * ) Notice: Subject to any disclaimer, the term of this patent is extended or adjusted under 35 U.S.C. 154(b) by 219 days.

(21) Appl. No.: 13/878,159

(22) PCT Filed: Jul. 8, 2011

(86) PCT No.: PCT/KR2011/005007
§ 371 (c)(1),
(2), (4) Date: Apr. 5, 2013

(87) PCT Pub. No.: WO2012/046948
PCT Pub. Date: Apr. 12, 2012

(65) Prior Publication Data
US 2013/0203924 A1      Aug. 8, 2013

(30) Foreign Application Priority Data

Oct. 6, 2010   (KR) .......................... 10-2010-0097351

(51) Int. Cl.
| | | |
|---|---|---|
| *C09J 11/04* | (2006.01) | |
| *A43B 13/22* | (2006.01) | |
| *B29D 7/00* | (2006.01) | |
| *A43B 13/04* | (2006.01) | |
| *B29D 35/00* | (2010.01) | |

(52) U.S. Cl.
CPC .................. *C09J 11/04* (2013.01); *A43B 13/04* (2013.01); *A43B 13/22* (2013.01); *B29D 7/00* (2013.01); *B29D 35/0054* (2013.01)

(58) Field of Classification Search
CPC ........... C08J 11/04; B29D 7/00; C08L 19/003
USPC .......................................... 524/264; 264/138
See application file for complete search history.

(56) References Cited

U.S. PATENT DOCUMENTS

| | | | | |
|---|---|---|---|---|
| 4,274,211 | A * | 6/1981 | Funck | 36/30 R |
| 4,598,485 | A * | 7/1986 | Joe et al. | 36/7.2 |
| 4,724,624 | A * | 2/1988 | Duclos | 36/116 |

FOREIGN PATENT DOCUMENTS

| | | |
|---|---|---|
| KR | 10-2004-0000671 A | 1/2004 |
| KR | 10-0493138 B1 | 6/2005 |
| KR | 10-0775021 B1 | 11/2007 |
| KR | 20-2009-0005788 U | 6/2009 |
| KR | 10-0969073 B1 | 7/2010 |
| KR | 10-0976276 B1 | 8/2010 |

* cited by examiner

*Primary Examiner* — Hannah Pak
(74) *Attorney, Agent, or Firm* — Birch, Stewart, Kolasch & Birch, LLP

(57) ABSTRACT

The present invention relates to a slip prevention pad and a method of manufacturing the slip prevention pad. The method includes coating emery with a rubber-metal adhesive and then drying the adhesive-coated emery; kneading a raw rubber with a rubber reinforcing material and a vulcanizing agent to prepare an unvulcanized rubber; mixing the adhesive-coated emery with the unvulcanized rubber to obtain a mixture; introducing the mixture into a rubber molding machine to vulcanize and mold the mixture to obtain a rubber product; and cutting the rubber product. The slip prevention pad may effectively prevent slipping on a slippery road surface such as a snowy road or an icy road.

12 Claims, 1 Drawing Sheet

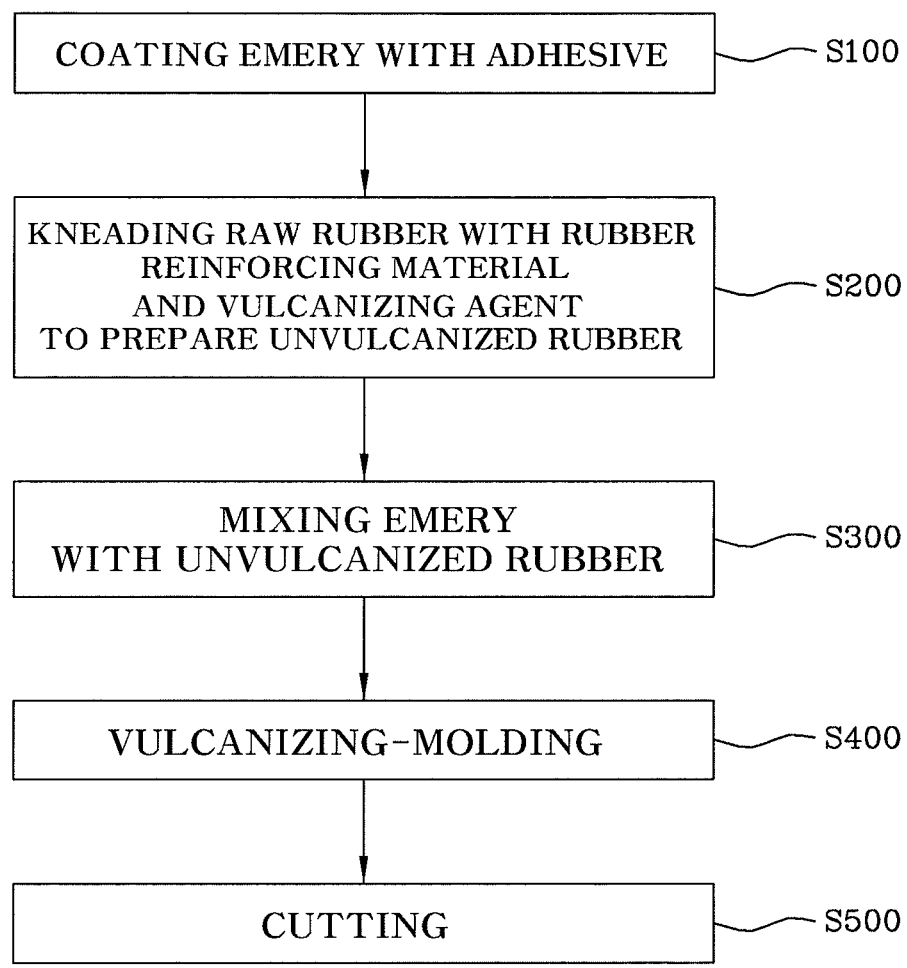

SLIP PREVENTION PAD AND METHOD OF MANUFACTURING THE SAME

TECHNICAL FIELD

The present invention relates to a slip prevention pad and a method of manufacturing the same, and, more particularly, to a slip prevention pad, which can effectively prevent a person from slipping on a slippery road surface such as a snowy road or an icy road and can allow a person to walk normally on a non-slippery road without inconvenience because it has suitable elasticity and friction coefficient, and a method of manufacturing the same, which includes the steps of: 1) coating emery with a rubber-metal adhesive and then drying the adhesive-coated emery; 2) kneading a raw rubber with a rubber reinforcing material and a vulcanizing agent to prepare unvulcanized rubber; 3) mixing the adhesive-coated emery with the unvulcanized rubber to obtain a mixture; 4) introducing the mixture into a rubber molding machine to vulcanize and mold the mixture to obtain a rubber product; and 5) cutting the rubber product.

BACKGROUND ART

When people walk or drive on a road that frequently freezes in winter due to snowfall and low temperatures, accidents are frequently caused by slipping, often resulting in injuries to the human body or even fatal accidents. However, sufficient safety measures for such slipping accidents have not yet been established, so many elderly persons and children slip on frozen roads or the like and suffer cerebral injuries, such as concussion, or bone fractures. Such accidents caused by slipping incur even more serious dangers when a vehicle being driven is involved.

As conventional technologies for preventing slipping and accidents caused thereby, there is a large number of slip prevention soles using adsorbing balls. For example, Korean Patent Registration No. 493138 discloses a slip prevention shoe having adsorbing balls and intake and exhaust ports. This slip prevention shoe is configured such that concave adsorbing balls, each being provided with intake and exhaust ports, are continuously connected with each other on the bottom surface of an elastic pad having the same shape as that of a sole of the shoe. This shoe is characterized in that intake and exhaust ports are formed in the shape of incised grooves so as to have air permeability, so adhesion is generated between a slippery road surface and the shoe during walking due to the air intake and exhaust actions of adsorbing balls and intake and exhaust ports, thereby preventing slipping.

However, this conventional technology is problematic in that a process of molding a shoe having absorbing balls and intake and exhaust ports is very complicated, and the manufacturing cost and working time thereof are increased, and in that it is very difficult for a person wearing this shoe to freely walk on a non-slip road, and also, this shoe is not aesthetically pleasing and is inconvenient to wear.

Meanwhile, as conventional technologies for preventing slipping, there are a large number of slip prevention spikes that are attachable to and detachable from the sole of a shoe. Korean Patent Registration No. 775021 discloses an example thereof. That is, Korean Patent Registration No. 775021 discloses a slip prevention spike, comprising: a body including a protruded connection member formed on one side of the body, first and second supports formed on the other side of the body such that they cross and face each other, elliptical protrusions formed on the inner sides of the first and second support, and a groove formed through the first support; a fixing rod connected to the groove of the body; a pushing unit connected with the fixing rod; and a holding unit formed on the inner side of the pushing unit and having a connection hole accommodating the connection member.

However, this slip prevention spike is also problematic in that walking on a non-slippery road surface is inconvenient and uncomfortable, and the spike must be attached or detached according to the circumstances, thus causing a user to experience stress and inconvenience.

DISCLOSURE

Technical Problem

Accordingly, the present invention has been made to solve the above problems occurring in the prior art, and an object of the present invention is to provide a slip prevention pad, which can effectively prevent a person from slipping on a slippery road surface such as a snowy road or an icy road and can allow a person to walk normally on a non-slippery road surface without inconvenience because it has suitable elasticity and friction coefficient.

Another object of the present invention is to provide a slip prevention pad, which can allow a wearer to walk continuously and can improve a wearer's convenience because it can be freely used without having to be attached or detached.

Technical Solution

In order to accomplish the above objects, an aspect of the present invention provides a method of manufacturing a slip prevention pad, including the steps of: 1) coating emery with a rubber-metal adhesive and then drying the adhesive-coated emery; 2) kneading a raw rubber with a rubber reinforcing material and a vulcanizing agent to prepare an unvulcanized rubber; 3) mixing the adhesive-coated emery with the unvulcanized rubber to obtain a mixture; 4) introducing the mixture into a rubber molding machine to vulcanize and mold the mixture to obtain a rubber product; and 5) cutting the rubber product.

Here, in step 3), the emery may be mixed in an amount of 25~100 parts by weight with respect to 100 parts by weight of the unvulcanized rubber.

Further, in step 1), the emery may be coated with the rubber-metal adhesive and then primarily dried while being stirred, and then the primarily-dried emery may be further coated with the rubber-metal adhesive and then secondarily dried while being stirred.

Further, in step 2), the raw rubber may be primarily kneaded with the rubber reinforcing material to prepare CMB, and then the CMB may be secondarily kneaded with the vulcanizing agent to prepare FMB.

Meanwhile, another aspect of the present invention provides a method of manufacturing a slip prevention pad, including the steps of: 1) coating emery with a rubber-metal adhesive and then drying the adhesive-coated emery; 2) kneading a raw rubber with a glass fiber, a rubber reinforcing material and a vulcanizing agent to prepare an unvulcanized rubber; 3) mixing the adhesive-coated emery with the unvulcanized rubber to obtain a mixture; 4) introducing the mixture into a rubber molding machine to vulcanize and mold the mixture to obtain a rubber product; and 5) cutting the rubber product.

Here, in step 2, the glass fiber may be mixed in an amount of 10~50 parts by weight with respect to 100 parts by weight of the raw rubber.

Meanwhile, still another aspect of the present invention provides a slip prevention pad, which is manufactured by the method including the steps of: 1) coating emery with a rubber-metal adhesive and then drying the adhesive-coated emery; 2) kneading a raw rubber with a rubber reinforcing material and a vulcanizing agent to prepare an unvulcanized rubber; 3) mixing the adhesive-coated emery with the unvulcanized rubber to obtain a mixture; 4) introducing the mixture into a rubber molding machine to vulcanize and mold the mixture to obtain a rubber product; and 5) cutting the rubber product.

Advantageous Effects

As described above, the method of manufacturing a slip prevention pad includes the steps of: 1) coating emery with a rubber-metal adhesive and then drying the adhesive-coated emery; 2) kneading a raw rubber with a rubber reinforcing material and a vulcanizing agent to prepare an unvulcanized rubber; 3) mixing the adhesive-coated emery with the unvulcanized rubber to obtain a mixture; 4) introducing the mixture into a rubber molding machine to vulcanize and mold the mixture to obtain a rubber product; and 5) cutting the rubber product. Therefore, the slip prevention pad manufactured by this method is advantageous in that it can effectively prevent a person from slipping on a slippery road surface, and can allow a person to walk normally on a non-slippery road surface without inconvenience, thus allowing a wearer to walk continuously and improving the wearer's convenience, and in that it can be freely used because it is not required to be attached or detached according to the state of a road surface.

DESCRIPTION OF DRAWINGS

The FIGURE is a flowchart showing a method of manufacturing a slip prevention pad according to an embodiment of the present invention.

Best Mode

Hereinafter, preferred embodiments of the present invention will be described in detail with reference to the attached drawings. In the description of the present invention, when it is determined that the detailed description of the related art would obscure the gist of the present invention, the description thereof will be omitted.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The FIGURE is a flowchart showing a method of manufacturing a slip prevention pad according to an embodiment of the present invention.

A method of manufacturing a slip prevention pad according to a first embodiment of the present invention includes the steps of: preparing emery and unvulcanized rubber; kneading the prepared emery and unvulcanized rubber; and vulcanizing and molding the mixture of the emery and unvulcanized rubber.

In the method, as a step of preparing emery before kneading, emery is coated with a rubber-metal adhesive (S100). Emery acts as a friction material on a slippery road or the like, and the particle size thereof may be suitably selected by those skilled in the art according to the target friction coefficient of the slip prevention pad. In this embodiment, emery of 60~100 meshes was used by way of example.

In step 1, the emery is coated with a rubber-metal adhesive in order to increase the adhesion force between the emery and the unvulcanized rubber at the time of kneading the emery and the unvulcanized rubber later. In this case, since a commonly-known rubber-metal adhesive may be used as the rubber-metal adhesive, a detailed description thereof will be omitted.

Meanwhile, it is preferred that emery be coated with the rubber-metal adhesive by two steps. That is, the emery may be coated with the rubber-metal adhesive and then dried while being stirred (primary coating), and then the primarily-coated emery may be further coated with the rubber-metal adhesive and then dried while being stirred (secondary coating), so the emery may be doubly coated with the rubber-metal adhesive.

In this embodiment, in the step of primary coating, 3.5 parts by weight of a rubber-metal adhesive (THiXON P-14, chemlok 202, chemlok 205 or the like) is mixed with 30 parts by weight of emery, and then completely dried. In the step of secondary coating, 4 parts by weight of another rubber-metal adhesive (THiXON 511T, THiXON 520 or the like) is mixed with the primarily-coated emery, and then completely dried.

In this case, it is preferred that the mixture of the emery and the rubber-metal adhesive be periodically stirred until the rubber-metal adhesive applied on the emery is completely dried. For example, it is more preferred that the mixture thereof be stirred about 4~5 times with respect to each period of about 10~20 minutes.

As such, after the emery coated with the rubber-metal adhesive is prepared, an unvulcanized rubber, which is another kneading material, is prepared. Of course, conversely, it is also possible to prepare the emery after preparing the unvulcanized rubber.

The unvulcanized rubber is prepared by kneading a raw rubber with a rubber reinforcing material and a vulcanizing agent. Preferably, the unvulcanized rubber is prepared by primarily kneading a raw rubber with a rubber reinforcing material to prepare CMB and then secondarily kneading the CMB with a vulcanizing agent or a vulcanization accelerator to prepare FMB.

Here, the rubber reinforcing material is a general rubber reinforcing material which means a chemical used to enhance the elastic properties of rubber in combination with the rubber. Carbon black, hard clay, white carbon, fine zinc oxide, magnesium carbonate, colloidal calcium carbonate and the like are examples of this rubber reinforcing material.

Further, the CMB is an unvulcanized rubber which is prepared by introducing a raw rubber, carbon (reinforcing agent), filler, softener, plasticizer and the like into a kneading machine such as a bambary mixer and then physically mixing them. The FMB is a process of providing targeted physical properties by mixing a vulcanizing agent such as sulfur and various chemicals with the primarily kneaded CMB.

In this case, the raw rubber may be at least one selected from the group consisting of natural rubber, synthetic rubber, NBR (acrylonitrile-butadiene rubber), EPDM, and fluororubber (Viton rubber) according to the use of a product. For example, in order to obtain a product requiring relatively higher adhesiveness, natural rubber having excellent mechanical properties, high adhesiveness and excellent workability may be selected, and in order to obtain a product having improved oil resistance and heat resistance, NBR, which is a cheap oil-resistant rubber having excellent workability and filling effect, may be selected. Further, in order to obtain a product having improved ozone resistance, weather resistance, heat resistance, aging resistance, chemical resistance and the like, EPDM may be selected. Such EPDM can be usefully used because it exhibits various colors and has excellent color stability. Further, in order to obtain a product having improved heat resistance, cold resistance, oil resistance, chemical resistance and the like, fluororubber may be selected.

As described above, when a reinforcing material and a vulcanizing agent are added to the raw rubber selected according to the use of a product and then kneaded to prepare an unvulcanized rubber (S200), the prepared unvulcanized rubber and the provided emery are kneaded by a kneading machine (S300). In this case, it is preferred that the emery be introduced into the kneading machine last after other raw materials. When the kneading process is carried out for a very long period of time after the introduction of the emery, the adhesive applied on the emery may be stripped. Therefore, it is preferred that the kneading time does not exceed about 20 minutes from the time of introduction of the emery. In this case, although the mixing ratio of the adhesive-coated emery to the unvulcanized rubber may be changed according to the use of a product and the target friction coefficient thereof, it is preferred that the emery be mixed in an amount of 25~100 parts by weight with respect to 100 parts by weight of the unvulcanized rubber.

When the kneading process (S300) of the unvulcanized rubber and the emery is completed, general rubber composition additives, for example, a coupling agent, process oil, stearic acid, an antiaging agent, zinc compounds, a vulcanizing agent and/or vulcanizing accelerator are selectively added to the obtained unvulcanized rubber composition kneaded with the emery, and this composition is introduced into a rubber molding machine such as a rubber press, a vacuum press or the like and then vulcanized and molded under a general vulcanizing condition to obtain a vulcanized rubber product (S400). Such a vulcanizing-molding work can be performed by a commonly-known method, and such additives can be suitably selected by those skilled in the art, so detailed descriptions thereof will be omitted.

When the vulcanizing-molding process (S400) is completed, the obtained vulcanized rubber product is suitably cut in predetermined thickness and shape according to the use and function thereof (S500). The cut vulcanized rubber product is effective at slip prevention because emery, which is a friction material, is uniformly applied on the surface thereof.

In this case, it is preferred that the edge of a cutter be sharp to such as degree that the emery-containing vulcanized rubber can be cut. More preferably, the edge of a cutter may be frequently grinded because it is damaged by long-term use.

When the cutting process (S500) is completed, the cut vulcanized rubber product serves as a slip prevention pad, and can be used for shoes by combining it with the shoe. As methods of combining the slip prevention pad with a shoe, the slip prevention pad may be combined with a shoe by placing the slip prevention pad on a die such that the section of the slip prevention pad faces the bottom of the die, disposing an unvulcanized rubber fabric on the slip prevention pad and then pressing the unvulcanized rubber fabric to attach the unvulcanized rubber fabric to the slip prevention pad, or by directly attaching the slip prevention pad to the sole of a shoe using an adhesive used in shoemaking.

Meanwhile, a method of manufacturing a slip prevention pad according to a second embodiment of the present invention includes the steps of: 1) coating emery with a rubber-metal adhesive and then drying the adhesive-coated emery; 2) kneading a raw rubber with a glass fiber, a rubber reinforcing material and a vulcanizing agent to prepare an unvulcanized rubber; 3) mixing the adhesive-coated emery with the unvulcanized rubber to obtain a mixture; 4) introducing the mixture into a rubber molding machine to vulcanize and mold the mixture to obtain a rubber product; and 5) cutting the rubber product.

The method according to the second embodiment of the present invention is additionally characterized in that, in step 2 of preparing the unvulcanized rubber, a glass fiber is additionally used. In this case, it is preferred that the glass fiber be mixed in an amount of 10~50 parts by weight with respect to 100 parts by weight of the raw rubber. Of course, the particle size of the glass fiber may be suitably selected by those skilled in the art according to the target friction coefficient of the slip prevention pad.

The above-configured slip prevention pad of the present invention can effectively prevent a person from slipping on a slippery road surface such as a snowy road or an icy road and can allow a person to walk normally on a non-slippery road surface without inconvenience because it has suitable elasticity and friction coefficient. Further, this slip prevention pad can allow a wearer to walk continuously and can improve the wearer's convenience because it can be freely used without having to be attached or detached.

As described above, the above-mentioned embodiments are set forth only to illustrate the present invention, and, as shown in the accompanying drawing, the present invention can be combined in various forms in order to realize the gist thereof.

Therefore, those skilled in the art will appreciate that various modifications, additions and substitutions are possible, without departing from the scope and spirit of the invention as disclosed in the accompanying claims.

The invention claimed is:

1. A method of manufacturing a slip prevention pad, comprising the steps of:
   1) coating emery with a rubber-metal adhesive and then drying the adhesive-coated emery;
   2) kneading a raw rubber with a rubber reinforcing material and a vulcanizing agent to prepare an unvulcanized rubber;
   3) mixing the adhesive-coated emery with the unvulcanized rubber to obtain a mixture;
   4) introducing the mixture into a rubber molding machine to vulcanize and mold the mixture to obtain a rubber product; and
   5) cutting the rubber product.

2. The method of claim 1, wherein, in step 3), the emery is mixed in an amount of 25-100 parts by weight with respect to 100 parts by weight of the unvulcanized rubber.

3. The method of claim 2, wherein, in step 1), the emery is coated with the rubber-metal adhesive and then primarily dried while being stirred, and then the primarily-dried emery is further coated with the rubber-metal adhesive and then secondarily dried while being stirred.

4. The method of claim 3, wherein, in step 2), the raw rubber is primarily kneaded with the rubber reinforcing material to prepare CMB, and then the CMB is secondarily kneaded with the vulcanizing agent to prepare FMB.

5. A method of manufacturing a slip prevention pad, comprising the steps of:
   1) coating emery with a rubber-metal adhesive and then drying the adhesive-coated emery;
   2) kneading a raw rubber with a glass fiber, a rubber reinforcing material and a vulcanizing agent to prepare an unvulcanized rubber;
   3) mixing the adhesive-coated emery with the unvulcanized rubber to obtain a mixture;

4) introducing the mixture into a rubber molding machine to vulcanize and mold the mixture to obtain a rubber product; and 5) cutting the rubber product.

6. The method of claim 5, wherein, in step 2, the glass fiber is mixed in an amount of 10-50 parts by weight with respect to 100 parts by weight of the raw rubber.

7. A slip prevention pad, manufactured by the method of claim 1.

8. A slip prevention pad, manufactured by the method of claim 2.

9. A slip prevention pad, manufactured by the method of claim 3.

10. A slip prevention pad, manufactured by the method of claim 4.

11. A slip prevention pad, manufactured by the method of claim 5.

12. A slip prevention pad, manufactured by the method of claim 6.

* * * * *